Feb. 19, 1935.                C. L. COOK                1,991,543
                         AGRICULTURAL IMPLEMENT
                    Filed Nov. 1, 1930      2 Sheets-Sheet 1
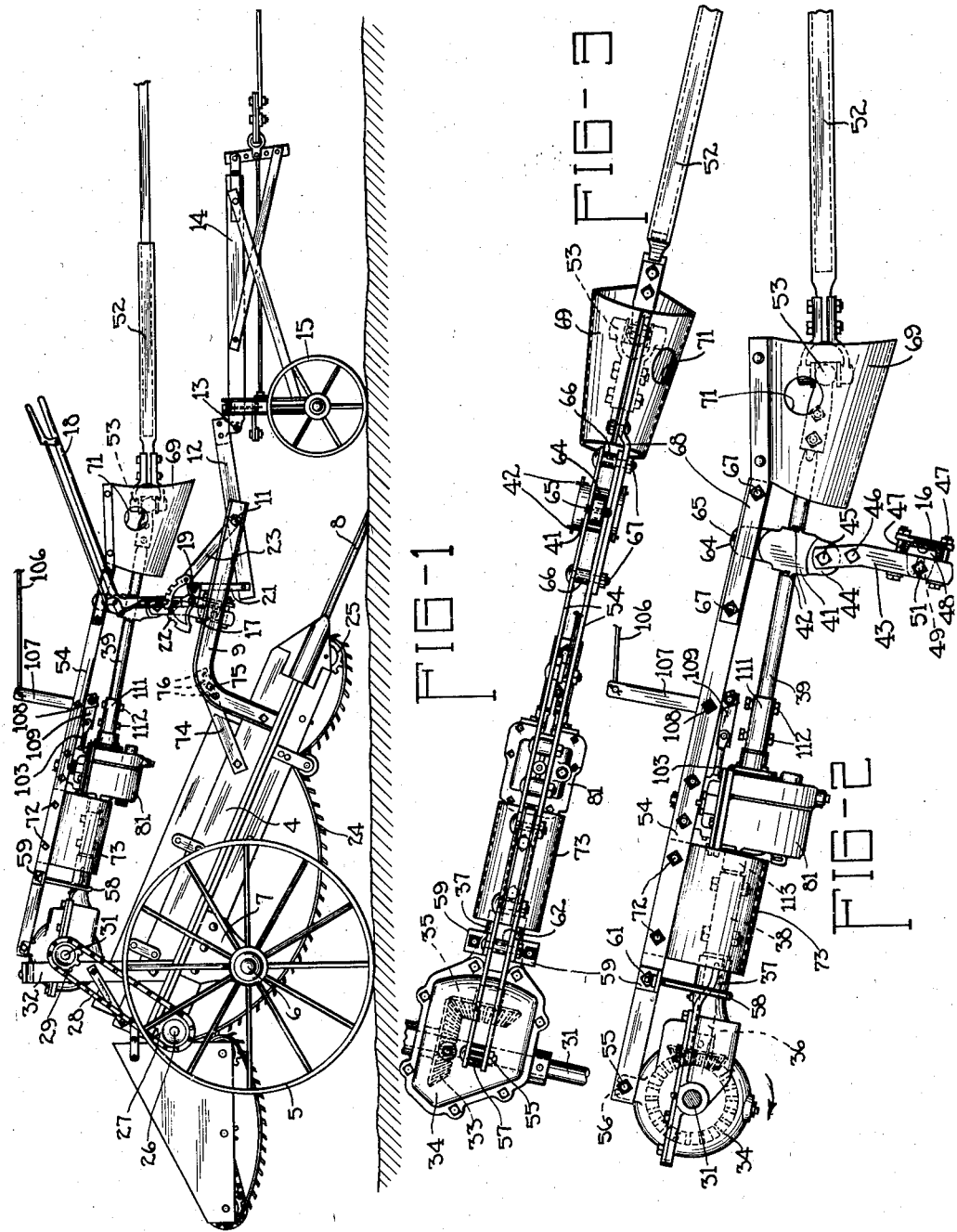
WITNESS
Walter Ackerman
INVENTOR
Curtiss L. Cook
BY Brown, Jackson, Boettcher & Dienner
ATTORNEYS Feb. 19, 1935.  C. L. COOK  1,991,543
AGRICULTURAL IMPLEMENT
Filed Nov. 1, 1930  2 Sheets-Sheet 2
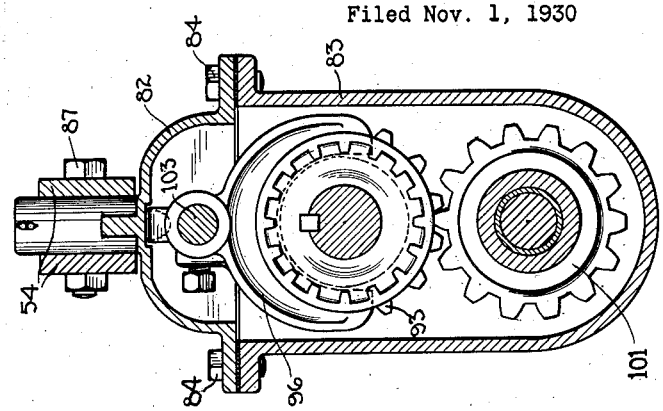
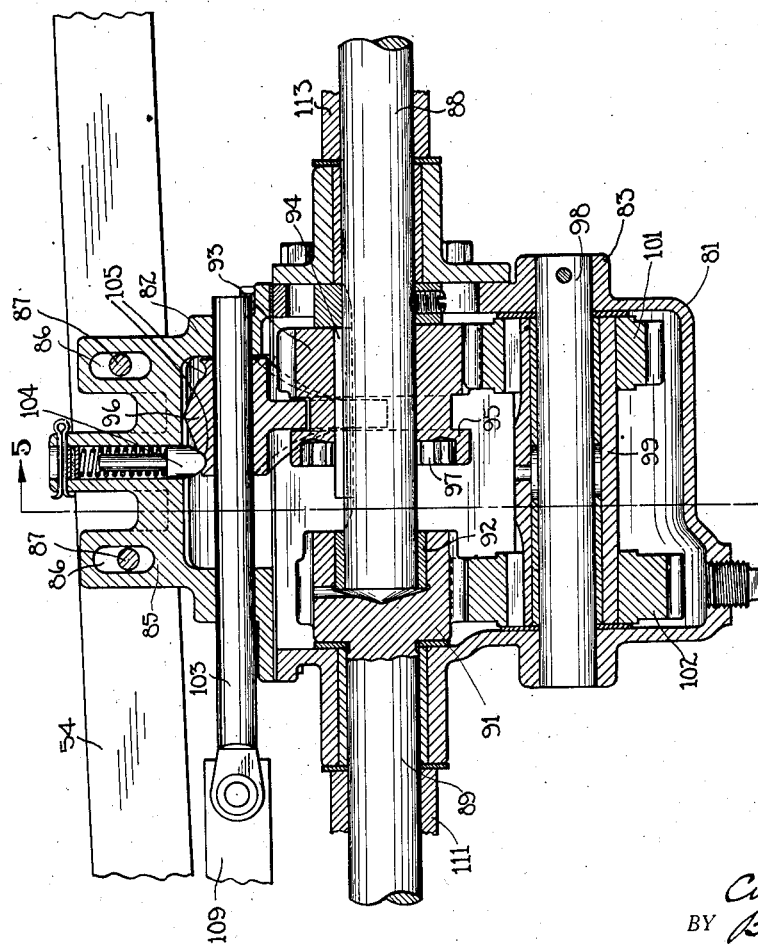
INVENTOR
Curtiss L. Cook
BY Brown, Jackson
Boettcher + Dienner
ATTORNEY

Patented Feb. 19, 1935

1,991,543

UNITED STATES PATENT OFFICE 1,991,543

AGRICULTURAL IMPLEMENT

Curtiss L. Cook, Syracuse, N. Y., assignor, by mesne assignments to Syracuse Chilled Plow Company Inc., Syracuse, N. Y., a corporation of New York Application November 1, 1930, Serial No. 492,686

25 Claims. (Cl. 55—51)

This invention relates to agricultural implements adapted to be propelled by a tractor and in which the operating parts of the implement are driven by power derived from the tractor through a power take-off shaft. I have illustrated my invention as applied to a potato digging machine adapted to be drawn by a tractor and in which the mechanisms, such as the conveyors, are driven from a transversely extending jack-shaft mounted on the implement and deriving its power from the longitudinally extending power take-off shaft through bevel gear mechanism enclosed in a housing, said housing being journaled on the jack-shaft with the power take-off shaft entering said housing and being provided with a bevel or other angle gear meshing with a corresponding type of gear therein mounted on the transverse jack-shaft. With this type of construction, when the implement is being operated and power is being delivered to the jack-shaft through the bevel gear mechanism, the turning moment applied to the bevel gear on the jack-shaft from the bevel pinion on the power take-off shaft causes the housing to tend to rotate, and as the rear end of the power take-off shaft is journaled in the housing this tendency of the housing to rotate is resisted by the power take-off shaft. Under certain conditions at times severe bending stresses may be imposed on the shaft which may cause the shaft bearing in the housing to wear excessively.

It has also been found desirable in machines of this type in which the power take-off shaft may be driven at a substantially constant speed regardless of the rate of progress of the tractor, to provide means whereby the speed of the various operating mechanisms of the implement, such as the conveyors, may be varied commensurately with the speed of the tractor, and/or relative to the speed of the power take-off shaft, so that if the operator finds it necessary to change the speed of the tractor, as from intermediate to low, the speed of such operating mechanisms may be correspondingly reduced without varying the speed of the power take-off shaft, and when the speed of the tractor is again increased the speed of the operating mechanisms may likewise also be increased.

It is the principal object of my invention to provide means for preventing this turning tendency of the housing.

Another object of the invention is to provide means for preventing excessive wear of the power take-off shaft bearing in the housing.

A further object of the invention is to provide a torque arm connected with the housing and with the frame of the implement for preventing turning tendency of the housing.

A still further object of the invention is the provision of a torque arm rigidly connected with said housing and slidingly connected with the frame of the implement for preventing such turning tendency of the housing.

A still further object of the invention is the provision of a bearing support for said power take-off shaft pivotally mounted on the frame and having sliding movement relative to said shaft.

A still further object of the invention is the provision of suitable gear mechanism supported by the torque arm and operable by the operator from his seat on the tractor whereby the speed of the operating mechanisms of the implement may be varied with respect to the speed of the power take-off shaft, as well as with respect to the speed of the tractor.

A still further object of the invention is the provision of guard means mounted on the torque arm for protecting the operator from the universal joint and other connections provided in the power take-off shaft.

Other objects and advantageous features will be apparent from the following description of my invention taken in connection with the accompanying drawings, in which—

Fig. 1 is a side view of a potato digging machine embodying my improvements;

Fig. 2 is an enlarged side elevation illustrating the torque arm, the bevel gear housing mounted on the jack-shaft, and the power take-off shaft; also the guard means and the means for varying the speed of the operating mechanisms of the digger which are carried by the torque arm;

Fig. 3 is an enlarged top plan view of the parts shown in Fig. 2;

Fig. 4 is an enlarged longitudinal sectional view through the speed varying mechanism carried by the torque arm; and Fig. 5 is a vertical sectional view taken on the line 5—5 of Fig. 4.

Referring to the drawings,—the potato digging machine illustrated comprises a downwardly and forwardly inclined frame 4 supported on two carrying wheels 5 journaled on opposite ends of a transverse axle 6 supported in brackets 7 depending from opposite sides of the frame 4 adjacent the rear end portion thereof. The forward end of the frame 4 is provided with the usual digging means 8. Two beams 9 secured to opposite sides of the frame 4 and extending upwardly and forwardly therefrom support the forward end of said frame in the following manner: Each of the beams 9 is pivotally connected at its forward end by means of a bolt 11 with the intermediate portion of longitudinally extending draft members or bars 12, the forward ends of the latter bars being pivotally connected at 13 with a front truck 14 supported on wheels 15, as is usual in implements of this type.

Extending transversely between the beams 9 about midway of the length of the forwardly extending portions of said beams, and connected thereto in any appropriate manner, is a beam 16, see Fig. 2, and secured to and extending upwardly from said beam is a bracket 17 on which is pivotally mounted an angularly shaped depth adjusting lever 18. The lower end of said lever is provided with a laterally extending arm 19 to which are pivotally connected a pair of downwardly extending links 21 having their lower ends pivotally connected respectively with the rear ends of the adjacent longitudinally extending bars 12. A notched sector 22 is also suitably supported upon the beam 16 adjacent to said lever, being held in fixed position relative to the beams 9 by means of a link 23 connecting said sector with the pivot bolt 11 before described. The lever 18 is provided with the usual detent adapted to seat in one or another of the notches provided in the sector 22 for that purpose. The depth of penetration of the digging device 8 at the forward end of the frame 4 may be adjusted by means of the lever 18 operating through the links 21 to raise and lower the rear ends of the bars 12 which swing vertically on the pivots 13, thereby adjusting the forward ends of the beams 9 vertically through their pivot connection 11 with said bars, all of which will be readily understood by those skilled in the art.

The reference numeral 24 indicates the front conveyor of the implement which is mounted to travel over a pair of sprockets 25 journaled on a transverse shaft at the forward end of the frame 4 adjacent the digging device 8, and over sprockets (not shown) fixed to a transverse shaft 26 journaled in the sides of the frame 4 at the rear thereof. Fixed on the outer end of the shaft 26 is a sprocket 27 which is driven by a chain 28 in turn driven from a sprocket 29 fixed on the outer end of a jack-shaft 31 suitably journaled in standards 32 extending upwardly from the frame 4.

A bevel gear 33 is fixed on the jack-shaft 31 and is enclosed in a housing 34 journaled on said shaft. A bevel gear 35 fixed on the rear end of a short shaft 36 journaled in a bearing extension 37 of the housing 34 meshes with the gear 33 for driving the same, the housing also enclosing said second gear as shown. The short shaft 36 is suitably connected by means of a coupling 38 with a power take-off shaft 39 extending rearwardly from the tractor and driven from the engine thereof. It will thus be seen that the housing 34 which is journaled in the jack-shaft 31 provides a bearing support for the rear end of the power take-off shaft.

Adjacent the forward end of the implement the shaft 39 is supported in a suitable bearing provided in a bearing support 41, said bearing being held in position in the support by means of cotter pins 42 or in any other appropriate manner. The bearing support 41 is pivotally supported by a pair of brackets 43 secured at their lower ends to the transverse beam 16 as hereinafter described, and to this end said support is provided with a lower lip portion 44 having parallel sides, which lip portion is embraced between the brackets 43 and pivotally connected therewith by means of a pivot bolt 45, the brackets being held in spaced relation to each other by means of a suitable spacing sleeve held in position between said brackets by means of a bolt 46. At their lower ends the brackets 43 are rigidly connected to the transverse beam 16 by means of two bolts 47 and a block 48 provided with a bifurcated lip 49, shown in dotted lines in Fig. 2, extending between the two brackets 43. The lower ends of said brackets are held connected together by means of a bolt 51, the lip 49 being clamped between said brackets by said bolt.

The shaft 39 is driven from the tractor through a telescopic power take-off connection 52 connected by means of a universal joint 53 with the forward end of said shaft.

When the implement is being operated, due to the fact that the housing 34 is merely journaled on the shaft 31 and has no other support on the frame, and by reason of the power being delivered to the gear 33 from the pinion 35 mounted on the shaft 36 journaled in the bearing portion 37 of the housing, said housing will tend to rotate in a clockwise direction as indicated by the arrow in Fig. 2, turning on the jack-shaft as a pivot. In order to counteract this tendency and hold the housing and bearing support in a fixed position relative to the jack-shaft without imposing any bending stress on the shaft 39, connected with the shaft 36 as above described, I provide what may be termed a torque arm comprising a pair of fore and aft extending parallel bars 54 positioned a short distance above the power take-off shaft as shown. The rear ends of said bars are connected together by means of a bolt 55 which rests in a transversely extending notch 56 formed in a lug 57 provided on the top of the housing 34. A U-bolt 58 depending from the bars 54 and embracing the bearing portion 37 of the housing 34 aids in counteracting the tendency of the housing to rotate in a clockwise direction as above described as such bolt supports said bearing portion 37 against downward movement relative to the power take-off shaft. The U-bolt 58 is supported from the bars 54 by means of angle brackets 59 connected to the bars by a bolt 61 having a spacing sleeve 62 mounted thereon between said bars.

The forward ends of the bars 54 rest on the top of the bearing support 41, being positioned on opposite sides of an upwardly extending lug 64 formed integral with said support, and are held against upward movement with respect to said support by means of a cotter pin 65 extending transversely through said lug. The front ends of the bars 54 are held in fixed spaced relation with respect to each other by means of two spacing sleeves 66 embracing bolts 67 spaced apart longitudinally along said bars, one fore and one aft of the bearing support 41.

To the forward end of one of the bars 54 as best shown in Fig. 3, is secured by means of the bolts 67 a forwardly extending bracket 68, to the forward end of which is bolted or otherwise suitably secured a cone-shaped sheet metal guard 69 which encircles the universal joint 53, and said guard is provided with a small opening 71 through which grease may be applied to said joint. This guard not only protects the operator from the grease on the joint, but also prevents his clothes from accidentally getting caught in the universal joint when the implement is in operation thus avoiding danger of injury to the operator. Bolted to the bars 54 near their rear ends adjacent the coupling 38 by means of bolts 72 is a cylindrical shaped sheet metal guard 73 which surrounds said coupling and prevents the operator from accidentally coming into contact with and being injured by the bolts on the coupling member 38.

To vary the range of depth control through the lever 18, the upper ends of brace bars 74 which support the beams 9 from the frame 4 by means of bolts 75, are provided with a series of holes 76 into any one of which the bolt 75 may be inserted to vary the angular position of the beams 9 with respect to the frame 4, as will be readily understood. These bars 74, therefore, not only function as supporting means for supporting the beams 9 from the frame 4, but also as means for varying the range of depth control of the digging device. When such adjustment of the bars 74 is made it is not necessary to make any adjustment of the bearing support 41 with respect to the forward ends of the torque arm bars 54, since such bearing support will merely slide forward or rearward on the power take-off shaft 39, pivoting on the bolt 45, and the lug 64 will slide into a new position between the spacing sleeves 66.

Coming now to the mechanism for varying the speed of the various operating parts of the digger so that their speed of operation may be regulated commensurately with the speed of the tractor and/or with respect to the speed of the power take-off shaft, as desired by the operator, such means is mounted in a suitable housing 81 comprising an upper section 82 and a lower section 83 suitably secured together by bolts 84 or in any other suitable manner. The housing 81 is carried by the torque arms 54, and for connecting said housing to the torque arms the upper section 82 thereof is provided with an upwardly extending flange portion 85 having vertically extending slots 86 therethrough adjacent its opposite ends, (see Fig. 4), and a bolt 87 is inserted through each of said slots and through alined openings in the torque arms 54, as shown in Figs. 4 and 5. The torque arms 54 thus serve to connect the housing 34 with the housing 81.

In the lower section 83 of said housing is mounted a driven shaft 88 and a drive shaft 89, which are positioned in alinement with each other as shown in Fig. 4. The drive shaft 89 terminates within the casing in a gear 91 provided with a bearing socket 92 in its end face in which the end of the driven shaft 88 is journaled. Slidably mounted on the driven shaft 88 within the housing 81 is a gear 93, said gear being held against rotation with respect to said shaft by means of a key 94. Said gear is provided peripherally with teeth adjacent to what will be termed its inner face, which is the face of the gear lying adjacent the wall of the lower housing section 83. Beyond these teeth said gear is provided with a circumferential recess 95 in which the arms of a shifting fork 96 are positioned. The outer face of the gear 93 is provided with internal teeth 97 which are adapted to intermesh with the teeth of the gear 91 when the gear 93 is shifted from the position shown in Fig. 4 to its alternative position as hereinafter described.

Fixed in the housing below the shafts 88, 89 is a shaft 98 having journaled thereon a sleeve 99. Keyed to one end of said sleeve is a pinion 101, while to the opposite end thereof is keyed a second pinion 102. As shown in Fig. 4, the pinion 102 is narrower than the gear 91, so that the teeth of the gear extend laterally some distance beyond the teeth of the pinion, this construction being provided so that when the gear 93 is shifted along the shaft 88 as hereinafter described the pinion will not interfere with and will permit intermeshing of the internal teeth 97 of the gear 93 with the laterally extending portions of the teeth of the gear 91.

With the shifting fork 96 and gear 93 in the position shown in Fig. 4, the gear 93 engages the teeth of the pinion 101, and as also shown in said figure the pinion 102 meshes with the teeth of the gear 91 on the end of the drive shaft 89. It will thus be seen that the driven shaft 88 is driven by means of the drive shaft 89 through the instrumentality of the following mechanism: The gear 91 drives the pinion 102, and as said pinion and the pinion 101 are keyed to the sleeve 99, rotation of the pinion 102 will rotate the pinion 101. Rotation of the pinion 101 rotates the gear 93, which in turn rotates the driven shaft 88.

In the particular arrangement illustrated, the gear 91 is provided with sixteen teeth, and the pinion 102 is provided with twenty-four teeth, while the gear 93 and the pinion 101 are provided with an equal number of teeth. With this arrangement a reduction of speed of three to two is obtained from the drive shaft 89 to the driven shaft 88 when the gear 93 engages the teeth of the pinion 101. When it is desired to drive the driven shaft at the same speed as the drive shaft, or obtain a one to one ratio between these two shafts, the operator slides the gear 93 along the shaft 88, disengaging said gear from the pinion 101 and causing the internal teeth 97 to intermesh with the teeth of the gear 91. With the parts in this position the pinions 101 and 102 will run idly, as will be readily understood.

The shifting of the gear 93 along the shaft in the manner above mentioned is controlled by means of the shifting fork 96 above mentioned, which is suitably fixed on a control rod 103 slidably mounted in the upper section 82 of the housing 81. For holding the shifting fork 96 in either of its two adjusted positions, a spring operated plunger 104 is provided, which plunger is adapted to bear in either one of two recesses 105 provided in the upper side of the shifting fork, as shown in Fig. 4.

The position of the sliding rod 103 is controlled by means of a rod 106, see Figs. 1 and 2, which extends forwardly to within easy reach of the operator seated on the tractor. At its rear end the rod 106 is pivotally connected to a lever 107 journaled between the torque arms 54 on a bolt 108. The lower end of this lever 107 is connected by means of a suitable link 109 with the forward end of the rod 103.

The drive shaft 89 is connected to the power take-off shaft 39 by means of a sleeve 111, suitably secured to each of said shafts by means of bolts 112, and the driven shaft 88 is suitably connected with the coupling 38 by means of a sleeve 113.

While in the present construction I have illustrated the housing 34 journaled on the jack-shaft and enclosing the gear 33 and pinion 35, said housing being provided with a bearing extension for the shaft 36, I wish it to be understood that my invention is not limited to the use of such enclosing housing in this connection as it would come within the scope of my invention to provide a bearing support for said shaft provided with an arm or arms suitably journaled on the jack-shaft.

I also wish it to be understood that while I have illustrated my invention as applied to a potato digging machine, it is not to be limited to use with such a machine, as it may be applied to any other type of implement to which it is adapted.

Further, I wish it to be understood that my invention, so far as the speed change mechanism, broadly considered, is concerned, has to do with mounting such change speed mechanism on the torque arm which prevents turning of the housing, and whereby such mechanism may be readily and easily operated by the operator on his seat on the tractor.

I claim:

1. The combination with a tractor propelled potato digging machine comprising a frame, of a jack-shaft rotatably mounted on said frame for driving the operating parts of the implement, a power take-off shaft for driving said jack-shaft from the tractor, a driven gear on said jack-shaft, a driving gear on said power take-off shaft for driving said driven gear, a bearing support for said power take-off shaft journaled on said jack-shaft, and a torque arm connected with said bearing support and with said frame for holding said bearing support against the torque stresses created by the drive through said gears.

2. The combination with a tractor propelled potato digging machine comprising a frame, of a jack-shaft rotatably mounted on said frame for driving the operating parts of the implement, a power take-off shaft for driving said jack-shaft from the tractor, driving gears interposed between said power take-off shaft and said jack-shaft for driving the latter from said power take-off shaft, a housing journaled on said jack-shaft and surrounding said gears, and a torque arm connected with said housing and with said frame for holding said housing against the torque stresses created by the drive through said gears.

3. The combination with a tractor propelled potato digging machine comprising a frame, of a jack-shaft rotatably mounted on said frame for driving the operating parts of the implement, a power take-off shaft for driving said jack-shaft from the tractor, a driven gear on said jack-shaft, a driving gear on said power take-off shaft for driving said driven gear, a bearing support for said power take-off shaft journaled on said jack-shaft, a torque arm spaced vertically from said power take-off shaft and supported by said frame, and means connecting said torque arm with said bearing support for holding said support against downward movement under the downwardly acting torque stresses created through said gears.

4. The combination with a tractor propelled implement comprising a frame, of a jack-shaft rotatably mounted on said frame for driving the operating parts of the implement, a power take-off shaft for driving said jack-shaft from the tractor, driving gears interposed between said power take-off shaft and said jack-shaft for driving the latter from said power take-off shaft, a housing journaled on said jack-shaft and surrounding said gears, a bearing extension on said housing for said power take-off shaft, a torque arm spaced vertically from said power take-off shaft and connected with said housing and with said frame, and means connecting said torque arm with said bearing extension for holding said extension against downward movement under the downwardly acting torque stresses created through said gears.

5. The combination with a tractor propelled implement comprising a frame, of a jack-shaft rotatably mounted on said implement for driving the operating parts thereof, a power take-off shaft for driving said jack-shaft from the tractor, driving gears interposed between said power take-off shaft and said jack-shaft for driving the latter from said power take-off shaft, a housing journaled on said jack-shaft and surrounding said gears, a bearing extension on said housing for said power take-off shaft, a torque arm spaced vertically from said power take-off shaft and connected with said housing and with said frame, and a U-bolt connected with and extending downwardly from said torque arm and embracing said bearing extension for holding said bearing extension against downward movement under the downwardly acting torque stresses created through said gears.

6. The combination with a tractor propelled potato digging machine comprising a frame, of a jack-shaft rotatably mounted on said frame for driving the operating parts of the implement, a power take-off shaft for driving said jack-shaft from the tractor, driving gears interposed between said power take-off shaft and said jack-shaft for driving the latter from said power take-off shaft, a housing journaled on said jack-shaft and surrounding said gears, and a torque arm connected at its rear end with said housing and having sliding connection with said frame at its forward end, said torque arm holding said housing against the torque stresses created by the drive through said gears.

7. The combination with a tractor propelled potato digging machine comprising a frame, of a jack-shaft rotatably mounted on said frame for driving the operating parts of the implement, a power take-off shaft for driving said jack-shaft from the tractor, driving gears interposed between said power take-off shaft and said jack-shaft for driving the latter from said power take-off shaft, a housing journaled on said jack-shaft and surrounding said gears, a torque arm connected at its rear end with said housing, and means connecting the forward end of said torque arm with said frame comprising a bearing support for said power take-off shaft, said torque arm holding said housing against the torque stresses created by the drive through said gears.

8. The combination with a tractor propelled implement comprising a frame, and a power take-off shaft for driving the operating parts of said implement comprising universal joint and coupling connections, of a longitudinally extending arm supported by said frame adjacent said power take-off shaft, and means carried by said arm for shielding said universal joint and coupling connections.

9. The combination with a tractor propelled implement comprising a frame, and a power take-off shaft for driving the operating parts of said implement comprising universal joint and coupling connections, of a longitudinally extending torque arm supported by said frame adjacent said power take-off shaft and adapted to support said power take-off shaft against bending stresses, and means carried by said torque arm for shielding said universal joint and coupling connections.

10. The combination with a tractor propelled implement comprising a frame, and a power take-off shaft for driving the operating parts of said implement comprising universal joint and coupling connections, of a longitudinally extending torque arm supported by said frame adjacent said power take-off shaft and adapted to support said power take-off shaft against bending stresses, and shields carried by said torque arm and encasing said universal joint and coupling connections.

11. The combination with a tractor propelled implement comprising a frame, a power take-off shaft, and a torque arm adjacent said shaft, of a support mounted on said frame, and means on said support providing adjustable support for said torque arm.

12. The combination with a tractor propelled implement comprising a frame, a power take-off shaft, and a torque arm adjacent said shaft, of a standard mounted on said frame adjacent the forward end thereof, and a bearing on said standard for said shaft, said bearing comprising a bearing support for said torque arm.

13. The combination with a tractor propelled implement comprising a frame, a power take-off shaft, and a torque arm, of a standard mounted on said frame, and a bearing support on said standard for said shaft and said torque arm capable of sliding movement with respect to said shaft and said arm.

14. The combination with a tractor propelled implement comprising a frame, a power take-off shaft, and a torque arm supported by said frame adjacent said shaft, of a standard mounted on said frame, a bearing support on said standard for said shaft and said torque arm and slidable with respect to said shaft and arm, and means mounted on said bearing support for holding said torque arm against upward movement relative thereto.

15. The combination with a tractor propelled implement comprising a frame, a power take-off shaft, and a torque arm, of a standard mounted on said frame for supporting said torque arm, and a bearing support for said shaft and said arm pivotally mounted on said standard, said support being slidable with respect to said shaft and said arm.

16. The combination with a tractor propelled implement comprising a frame, a power take-off shaft, and a torque arm, of a standard mounted on said frame for supporting said torque arm, a bearing support for said shaft and said arm pivotally mounted on said standard, said support being slidable with respect to said shaft and said arm, and means mounted on said bearing support for holding said torque arm against upward movement relative thereto.

17. The combination with a tractor propelled implement comprising a frame, of a jack-shaft rotatably mounted on said frame for driving the operating parts of the implement, a power take-off shaft for driving said jack-shaft from the tractor, a torque arm connected with said frame and with said power take-off shaft for holding said power take-off shaft against the torque stresses created by the rotation thereof, and means interposed between said jack-shaft and said power take-off shaft for varying the speed of said jack-shaft relative to said power take-off shaft.

18. The combination with a tractor propelled implement comprising a frame, of a jack-shaft rotatably mounted on said frame for driving the operating mechanisms of the implement, a power take-off shaft for driving said jack-shaft from the tractor, a torque arm connected with said frame and with said power take-off shaft for holding said power take-off shaft against the torque stresses created by the rotation thereof, and means carried by said torque arm and operatively connected with said jack-shaft and said power take-off shaft for varying the speed of said jack-shaft relative to said power take-off shaft.

19. The combination with a tractor propelled implement comprising a frame, of a power take-off shaft for driving the operating mechanisms of said implement, change speed mechanism for varying the speed of said operating mechanisms relative to the speed of said power take-off shaft, and torque stress resisting means mounted on said frame for supporting said power take-off shaft and holding the same against bending stresses created therein through the driving thereof and for supporting said change speed mechanism.

20. The combination with a tractor propelled implement comprising a frame, of a power take-off shaft for driving the operating parts of said implement, a bearing support for said shaft, and a torque arm supported by said frame adjacent said shaft and connected with said bearing support for supporting said shaft against bending stresses created therein through the driving thereof.

21. The combination with a tractor propelled potato digging machine comprising a frame, of a jack-shaft rotatably mounted on said frame for driving the operating parts of the machine, a power take-off shaft for driving said jack-shaft from the tractor, a housing journaled on said jack-shaft, change speed mechanism for varying the speed of said jack-shaft relative to the speed of said power take-off shaft, a housing supporting said change speed mechanism, and means connecting said first named housing with said second housing.

22. The combination with a tractor propelled implement comprising a frame, of a jack-shaft rotatably mounted on said frame for driving the operating parts of the implement, a power take-off shaft for driving said jack-shaft from the tractor, driving gears interposed between said power take-off shaft and said jack-shaft for driving the latter from said power take-off shaft, a housing journaled on said jack-shaft and surrounding said gears, change speed mechanism for varying the speed of said operating mechanisms relative to the speed of said power take-off shaft, a housing enclosing said change speed mechanism, and means interconnecting said housings.

23. The combination with a tractor propelled implement comprising a frame, a power take-off shaft, and a torque arm adjacent said shaft, of a standard mounted on said frame adjacent the rear end thereof, and a bearing on said standard for said shaft, said bearing comprising a bearing support for said torque arm.

24. The combination with a tractor propelled implement comprising a frame, a power take-off shaft, and a torque arm adjacent said shaft, of a standard mounted on said frame adjacent the rear end thereof, a bearing on said standard for said shaft, said bearing comprising a bearing support for said torque arm, a second standard mounted on said frame adjacent the forward end thereof, and a bearing on said second standard for said shaft and said torque arm being capable of sliding movement with respect to said shaft and said arm.

25. The combination with a tractor propelled implement comprising a frame, of a jack-shaft rotatably mounted on said frame for driving the operating parts of the implement, a power take-off shaft for driving said jack-shaft from the tractor, a driven gear on said jack-shaft, a driving gear on said power take-off shaft for driving said driven gear, a bearing support for said power take-off shaft journaled on said jack-shaft, and torque stress resisting means connected with said bearing support and with said frame for holding said bearing support against the torque stresses created by the drive through said gears.

CURTISS L. COOK.